United States Patent
Kothari et al.

(10) Patent No.: US 10,057,739 B2
(45) Date of Patent: Aug. 21, 2018

(54) DISTRIBUTED AND LOCALIZED POLICY AND CHARGING CONTROL IN CELLULAR NETWORKS TO ENABLE ROUTE FLEXIBILITY

(71) Applicant: International Business Machines Corporation, Armonk, NY (US)

(72) Inventors: Ravi Kothari, Bangalore (IN); Dilip Krishnaswamy, Bangalore (IN); Mukundan Madhavan, Bangalore (IN); Vijay Purushottam Gabale, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/918,862

(22) Filed: Oct. 21, 2015

(65) Prior Publication Data

US 2017/0118616 A1    Apr. 27, 2017

(51) Int. Cl.
*H04M 11/00*    (2006.01)
*H04L 29/06*    (2006.01)
(Continued)

(52) U.S. Cl.
CPC ............. *H04W 4/24* (2013.01); *H04M 15/66* (2013.01); *H04M 15/8214* (2013.01)

(58) Field of Classification Search
CPC .... H04W 4/24; H04M 15/66; H04M 15/8214
(Continued)

(56) References Cited

U.S. PATENT DOCUMENTS 6,260,072 B1 * 7/2001 Rodriguez-Moral ... H04L 45/00
 709/238
6,463,275 B1   10/2002 Deakin
(Continued)

FOREIGN PATENT DOCUMENTS

| CN | 103313223 A | 9/2013 |
| EP | 2477427 A1 | 8/1988 |
| WO | 2009006630 A1 | 1/2009 |

OTHER PUBLICATIONS

Li et al. Toward Software Defined Cellular Networks, 2012.
(Continued)

*Primary Examiner* — Rafael Pérez-Gutiérrez
*Assistant Examiner* — Mark G. Pannell
(74) *Attorney, Agent, or Firm* — Ryan, Mason & Lewis, LLP

(57) ABSTRACT

Methods, systems, and computer program products for distributed and localized policy and charging control in cellular networks are provided herein. A computer-implemented method includes configuring, within a network, (i) policy and charging enforcement functionality and (ii) policy and charging rules functionality by: implementing (i) remote policy and charging enforcement functionality components and (ii) remote policy and charging rules functionality components within the network, wherein each of the remote components executes in a virtual machine on a compute node that is co-located with an evolved node B; and retaining (i) centralized policy and charging enforcement functionality components and (ii) centralized policy and charging rules functionality components within the network; and executing transactions on the network via: implementing an interaction between (a) the centralized components and (b) the remote components to transmit information to a billing system associated with the telecommunications network.

19 Claims, 14 Drawing Sheets

(51) Int. Cl.
*H04W 4/00* (2018.01)
*H04W 4/24* (2018.01)
*H04M 15/00* (2006.01)

(58) Field of Classification Search
USPC .......................................................... 455/406
See application file for complete search history.

(56) References Cited

U.S. PATENT DOCUMENTS

| | | | |
|---|---|---|---|
| 8,144,591 B2 | 3/2012 | Ghai et al. | |
| 8,483,693 B2 | 7/2013 | Shaheen | |
| 8,862,132 B2 | 10/2014 | Arauzo et al. | |
| 9,560,512 B2* | 1/2017 | Shan | H04W 72/0413 |
| 2003/0110044 A1 | 6/2003 | Nix et al. | |
| 2009/0228956 A1* | 9/2009 | He | H04L 63/20 726/1 |
| 2011/0151826 A1* | 6/2011 | Miller | H04W 28/26 455/404.1 |
| 2011/0299395 A1* | 12/2011 | Mariblanca Nieves | H04L 12/5695 370/235 |
| 2012/0117220 A1* | 5/2012 | Mariblanca Nieves | H04L 12/14 709/223 |
| 2014/0018067 A1* | 1/2014 | Rajagopalan | H04W 8/20 455/432.1 |
| 2014/0153504 A1* | 6/2014 | Wang | H04W 28/14 370/329 |
| 2014/0309806 A1* | 10/2014 | Ricci | B60Q 1/00 701/1 |
| 2014/0329495 A1* | 11/2014 | Park | H04M 15/66 455/406 |
| 2015/0173111 A1* | 6/2015 | Agarwal | H04W 12/06 370/329 |
| 2015/0230074 A1* | 8/2015 | Zeng | H04L 12/1407 455/408 |

OTHER PUBLICATIONS

Li et al. CellSDN: Software-Defined Cellular Networks, 2012.
Jin et al. CellSDN: Software-Defined Cellular Core Networks, 2013.

* cited by examiner

DISTRIBUTED AND LOCALIZED POLICY AND CHARGING CONTROL IN CELLULAR NETWORKS TO ENABLE ROUTE FLEXIBILITY

FIELD

The present application generally relates to information technology, and, more particularly, to cellular network management.

BACKGROUND

Challenges exist pertaining to inefficiency in data paths in cellular data networks due to delay, jitter, congestion, etc. Longer paths introduce unnecessary delay, jitter, and/or congestion on access/core links, which result in decreased quality of experience (QoE) for applications such as voice and video. Existing cellular network management approaches include centralized policy enforcement and charging at a gateway node in cellular networks. With such approaches, however, even those calls which fall under the same base station have to traverse the central gateway node to get billed. This not only results in longer latencies but also increased bandwidth pressure on the core links.

SUMMARY

In one embodiment of the present invention, techniques for distributed and localized policy and charging control in cellular networks to enable route flexibility are provided. An exemplary computer-implemented method can include configuring, within a telecommunications network, (i) policy and charging enforcement functionality and (ii) policy and charging rules functionality by: implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a virtual machine or a software container on a compute node that is co-located with an evolved node B within the telecommunications network; and retaining (i) one or more centralized policy and charging enforcement functionality components and (ii) one or more centralized policy and charging rules functionality components within the telecommunications network. The exemplary computer-implemented method can also include executing one or more transactions on the telecommunications network via: implementing (a) an interaction between (i) one or more of the centralized policy and charging enforcement functionality components and (ii) one or more of the centralized policy and charging rules functionality components and (b) an interaction between (i) one or more of the remote policy and charging to enforcement functionality components and (ii) one or more of the remote policy and charging rules functionality components to transmit information pertaining to one or more policies and/or billing information related to a user data flow to a billing system associated with the telecommunications network.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
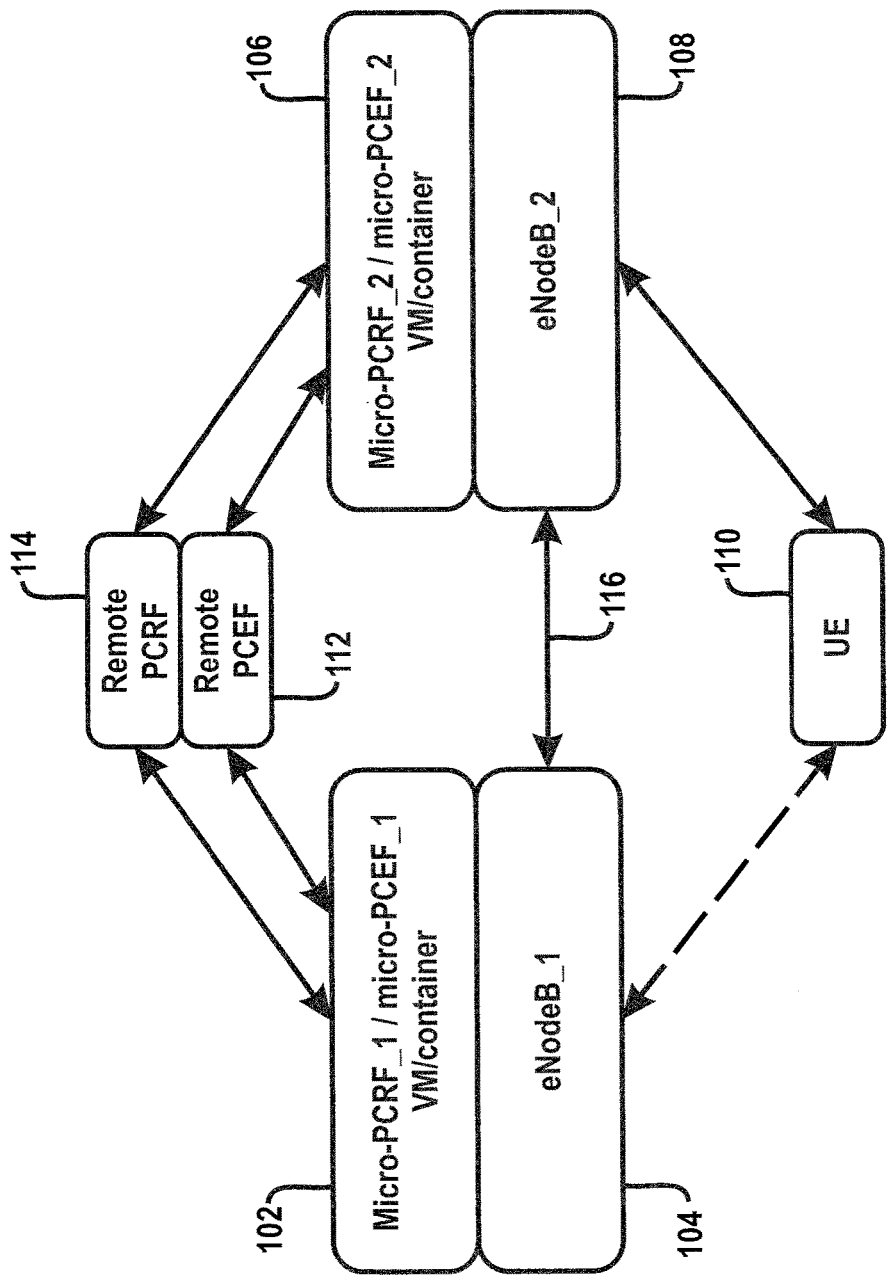
FIG. 1 is a diagram illustrating a billing hand-off, according to an example embodiment of the invention.

As described herein, an embodiment of the present invention includes distributed and localized policy and charging control in cellular networks to enable route flexibility. At least one embodiment of the invention includes implementing micro and macro blocks to enable efficiency in cellular data network architectures. As detailed herein, because routes need to traverse at least one billing block, micro billing boxes can be distributed in the network to determine optimized paths for different types of network flows.

One or more embodiments of the invention include creating and/or enabling data routes in a cellular network by splitting the policy and charging enforcement function (PCEF) and/or the policy and charging rules function (PCRF) functionality into at least one local micro-PCEF and/or PCRF entity while retaining the central/centralized PCEF and/or PCRF entity. As detailed herein, PCRF and PCEF components/entities can interface to a billing subsystem and can carry out different functions based on whether a call is pre-paid or post-paid. As further detailed herein, at least one embodiment of the invention includes enabling E-UTRAN Node B, also referred to as Evolved Node B (eNodeB), to interact with the local PCEF and/or PCRF entity to complete transactions related to policy enforcement and/or billing information by obtaining policies and/or commit billing information related to a user data flow from a remote PCEF and/or PCRF entity interacting with the local PCEF and/or PCRF entity. Such an embodiment can also include determining and/or enforcing policy rules on the user data flow based on the interaction between the local PCRF and the local PCEF entities for routing the user data through one or more optimized paths.

As also detailed herein, at least one embodiment of the invention includes splitting PCRF and/or PCEF functionalities between a central component at a packet data network gateway (PGW) and a local micro-PCRF and/or PCEF component close to the eNodeB, and utilizing this setup to carry out billing of calls locally at the micro-PCEF and/or PCRF. With the splitting of the components, functions are utilized to maintain information consistency across the nodes, wherein such functions can include the local micro-PCEF/PCRF entities requesting policy and/or subscription information for a user from a remote PCEF/PCRF entity, or requesting credit information associated with a user for a pre-paid call, or writing user billing information after the completion of a call. Such an embodiment can additionally include ensuring billing consistency during hand-offs across micro-PCRF and/or PCEF components and a central PCEF component through synchronization protocols for post-paid/pre-paid calls.

By way of illustration, consider the following example scenario. At the time of a hand-off, a new local micro-PCRF/PCEF starts monitoring billing information for a user, sets up a local billing session for a new user, and informs the remote PCEF/PCRF component about its new responsibility, whereas a previously serving local micro-PCRF/PCEF component commits partial billing information that it has gathered back to a remote PCRF/PCEF component once the hand-off is complete. Also, in anticipation of a hand-off, the new local micro-PCRF/PCEF can pre-authenticate (authenticate in advance) the user with the remote/central PCRF/PCEF component (such as by obtaining information about the user subscription or credit information from the remote/central PCRF/PCEF component) such that the new local micro-PCRF/PCEF component is ready to continue processing billing information for the user.

Accordingly, FIG. 1 is a diagram illustrating a billing hand-off, according to an example embodiment of the invention. By way of illustration, FIG. 1 depicts micro-PCEF/micro-PCRF functionalities placed adjacent to eNodeBs. The micro-PCRF and micro-PCEF components can be implemented within a virtual machine (VM) or a container application executing on a computing node co-located with the eNodeBs that can communicate with remote PCEF and PCRF components. In FIG. 1, for example, the micro-PCEF_1/micro-PCRF_1 components 102 are placed adjacent to eNodeB_1 104, and micro-PCEF_2/micro-PCRF_2 components 106 are placed adjacent to eNodeB_2 108. If the user equipment (UE) 110 is initially associated with eNodeB_1 104 and if the UE 110 moves closer to eNodeB_2 108, then the UE's connectivity is set-up with eNodeB_2 108 and its prior connectivity with eNodeB_1 104 is eliminated. As the UE 110 and the eNodeBs (104 and 108) prepare for a hand-off from eNodeB_1 104 to eNodeB_2 108, the micro-PCEF_2/micro-PCRF_2 components 106 start communicating with the remote PCEF component 112 and the remote PCRF component 114 to pre-authenticate the UE 110 with the remote PCEF/PCRF components (112 and 114), and to prepare for the billing session by exchanging information associated with the policies (such as post-paid or pre-paid policies, charging rates, or available credits) for the user.

Alternatively or additionally, the micro-PCEF_1/micro-PCRF_1 components 102 can communicate with the micro-PCEF_2/micro-PCRF_2 components 106 over an X2 interface between eNodeB_1 104 and eNodeB_2 108 to provide such information associated with the UE 110 to pre-authenticate the user and/or to providing billing/charging/credits information associated with the UE 110. When the hand-off is completed, the micro-PCEF_2/micro-PCRF_2 component 106 starts monitoring the billing information associated with the user, and the micro-PCEF_1/micro-PCRF_1 component 102 commits billed information back to the remote PCEF/PCRF nodes (112 and 114).

In cases wherein connectivity with remote PCEF/PCRF nodes (112 and 114) is not available (such as in the case of disconnected operations in edge deployments), such billing information can be forwarded over a direct connection path 116 (for example, over the X2 interface between eNodeBs in a long-term evolution (LTE) system) between the micro-PCEF_1/micro-PCRF_1 components 102 and the micro-PCEF_2/micro-PCRF_2 components 106. The UE billing information can then be accumulated at the micro-PCEF_2/micro-PCRF_2 components 106, to be further forwarded and accumulated by other micro-PCEF/micro-PCRF components that may serve the UE 110 as it moves. Alternatively, each of the micro-PCEF/micro-PCRF components that served a mobile UE can locally store the billing information and eventually commit their information to remote PCEF/PCRF nodes (such as 112 and 114) whenever such components establish connectivity with the remote PCEF/PCRF nodes, or whenever such components commit aggregated billing information with the remote PCEF/PCRF nodes.

In accordance with one or more embodiments of the invention, a micro-PCRF can be placed anywhere in a network. To account for each byte, the network flows traverse at least one billing function. By leveraging the above-noted split and placing micro blocks in the network (such as, for example, near the edge of the network), at least one embodiment of the invention can include optimizing routes in the network and enabling optimized services via optimized locations that can enable optimized routes in a network. An example of an optimized service is to enable communications between two users that are within close proximity of each other (within a mile or a few miles of each other, for example). In such an example, a voice or data or multimedia call between the two users is typically routed via a core network that is in a different geographic location relative to the users, with billing information captured within that remote core network. However, in accordance with one or more embodiments of the invention, the path for the call between the users can be optimized by splitting the billing components into local and remote billing components, such that a local billing component can reside at an optimized location closer to a user, and such that the local billing component exchanges billing/charging information with a remote billing component.

Another example of an optimized service can include enabling data communications for a user that bypasses most of the existing infrastructure such that packets take a shorter path to an Internet destination. If an Internet protocol (IP) router is available closer to the user relative to an original path via a core network, the packets can be communicated via that router to reduce latencies. In such a case, a local billing component can be placed near the router to monitor the packets associated with the user, such that the local billing component communicates with a remote billing/charging component. Network function virtualization allows virtual network functions to be relocated as needed. This can enable collapsing of network protocol stacks with virtual machines or containers associated with network functions (such as the eNodeB, a serving gateway (SGW), a mobility management entity (MME), and PGW functions in an LTE system executing in virtual machines or containers and collapsed at a network node close to a user, or split across network nodes but placed close to the user), which can enable early IP exit points in the network to allow packets to be routed to the Internet more quickly. Optimization of routing in such virtualized infrastructure can thus be enabled by collapsing network stacks to enable an IP route locally.

In general, the optimization of routing flows can be based on distributed charging, application requirements, and network characteristics such as bandwidth and/or latency variations. Route computations, in one or more embodiments of the invention, can also incorporate QoE fairness considerations, wherein weighted proportional fairness values are applied to applications based, for example, on service level agreements (SLAs).

Figure 2:
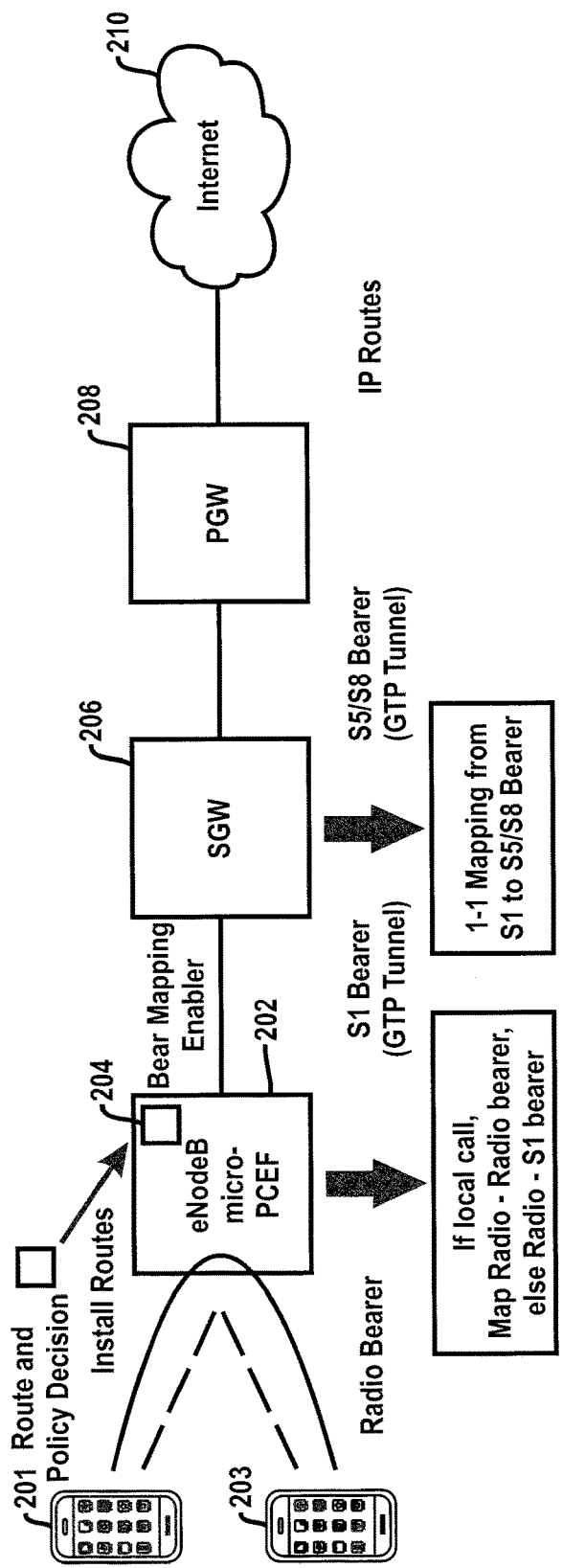
FIG. 2 is a diagram illustrating packet routing, according to an example embodiment of the invention.

FIG. 2 is a diagram illustrating packet routing, according to an example embodiment of the invention. By way of illustration, FIG. 2 depicts a call between mobile/cellular phone 201 and mobile/cellular phone 203 in a fourth generation (4G) LTE system, which further involves eNodeB micro-PCEF component 202 (which includes a route and policy decision component 204 installed thereon), a serving gateway (SGW) component 206, a PGW component 208, and an Internet component 210 (which facilitates internet protocol (IP) routes).

In an example embodiment such as depicted in FIG. 2, the user equipment (UE) includes the mobile devices 201 and 203 associated with respective mobile users. The eNodeB (evolved NodeB or base-station) 202 is part of the radio access network (RAN) in the system, and enables devices to access the network over wireless channels over control and user planes by providing support for functions such as physical and mandatory access control (MAC) layer processing for wireless access, setting-up radio bearers for wireless channel access, and dynamic link adaptation. The SGW 206 and PGW 208 are part of the evolved packet core (EPC) network in a 4G system that address service aspects such as relating to service enablement, mobility, authentication, setting-up core network bearers, and packet gateway functions. Although components in a 4G LTE communications system are depicted in FIG. 2, one or more embodiments of the invention can include replacing these nodes with equivalent components in other systems such as a 3G system (for example, such as the combination of a NodeB (base-station) and RNC (radio network controller) in the radio access network of a 3G system, and a serving GPRS support node (SGSN) and a gateway GPRS support node (GGSN) in the core network of a 3G system). The connectivity over the air between a UE (201 or 203) and eNodeB 202 is referred to as a radio bearer. The connectivity (typically wired over a T1 line, for example) between eNodeB 202 and SGW node 206 is referred to as an S1 bearer. The connectivity between SGW 206 and PGW 208 is referred to as an S5/S8 bearer. Typically, for example, a S5 bearer is used for connectivity between an SGW and a PGW in the home network for a UE. When the UE roams, an S8 interface is used to connect between a visited SGW and the home PGW for the UE. The combination of the radio bearer and an S1 bearer is referred to as an E-RAB (E-UTRAN radio access bearer). The combination of an E-RAB and the S5/S8 Bearer is referred to as an EPS (Evolved Packet Service) bearer.

In connection with the eNodeB micro-PEF component 202, when a call is established, if the call is a local call hosted at an eNodeB between two UEs connected to the eNodeB, a radio bearer is allocated for the client devices (UEs) to communicate with the eNodeB. Then, the two UEs can communicate with each other utilizing these radio bearers for the data flow between them. Some functionality associated with the SGW and the PGW, such as managing quality of service (QoS) for the communications or handling billing/charging using a micro-PCEF/PCRF, can be collapsed at the eNodeB to enable end-to-end processing for the call. Alternatively, if the two UEs are connected to different eNodeBs, wherein the eNodeBs are connected via an X2 link, network resources are required only for the radio bearer between each UE and eNodeB pair, and on the X2 link between the eNodeBs. If the eNodeBs are only connected to the same common SGW, then radio bearer resources are required between each UE and eNodeB pair, and also on the S1 bearers between each eNodeB and the common SGW for the two eNodeBs, such that a call between the two UEs is connected via the common SGW. In a case wherein the two UEs are connected to different SGWs, the connectivity between the UEs can come via a common PGW, which would require additional resources on S5/S8 bearers, or alternatively via a direct network path between the two SGWs.

To the extent possible, the connectivity between the communicating devices is minimized. In the case of a UE communicating with the a node external to the network, if an early IP exit point is available by collapsing network functions, then such an optimized route can be taken. In all such optimized routes, local PCRF/PCEF components can be placed on network nodes in the optimized route paths, wherein such local PCRF/PCEF components can interact with a remote PCRF/PCEF component to exchange billing/charging information.

Figure 3:
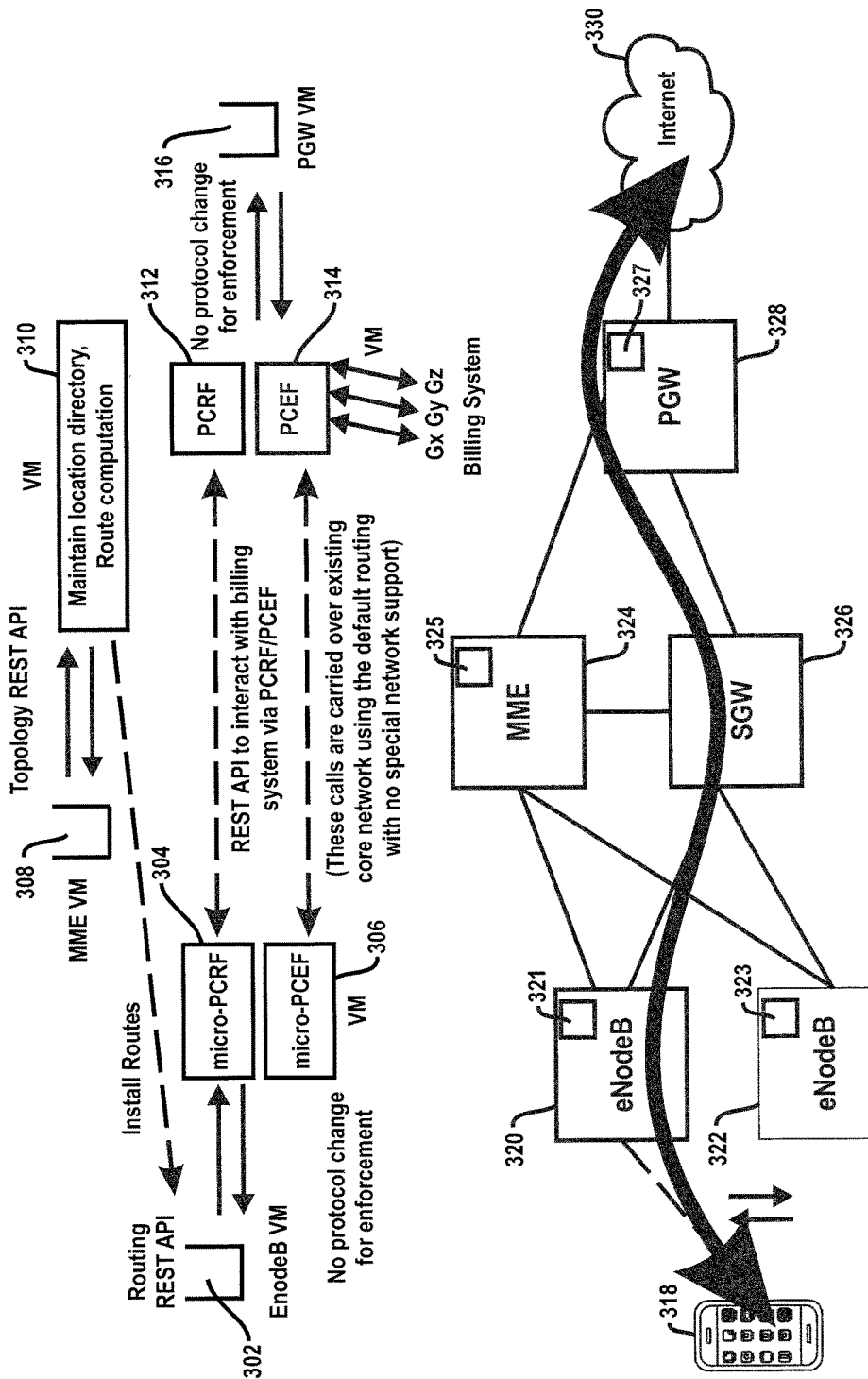
FIG. 3 is a diagram illustrating a split policy and charging enforcement function (PCEF) mechanism, according to an example embodiment of the invention.

FIG. 3 is a diagram illustrating a split PCEF mechanism, according to an example embodiment of the invention. By way of illustration, FIG. 3 depicts a routing representational state transfer (REST) API at an eNodeB virtual machine (VM) 302, which interacts with a micro-PCRF component 304 and a micro-PCEF component 306. FIG. 3 also depicts a topology REST API at a mobility management entity (MME) VM 308, which interacts with a VM 310 that maintains a location directory, carries out route computations, and installs routes onto the eNodeB VM 302. Further, FIG. 3 depicts a PGW VM 316, which interacts with a PCRF component 312 and a PCEF component that are associated with a billing system.

As noted in FIG. 3, the REST API at the eNodeB VM 302 interacts with the billing system via micro-PCRF component 304 and micro-PCEF component 306 interacting with PCRF component 312 and PCEF component 314. As also noted, calls handled via an implementation of an embodiment of the invention such as the example depicted in FIG. 3 can be carried over an existing core network using the default routing with no special network support.

FIG. 3 additionally depicts an example route for a call from a phone 318 across an arrangement of components that include (similar to the example components detailed above with respect to FIG. 3) eNodeB component 320 (with a micro-PCRF/micro-PCEF component 321 installed thereon), eNodeB component 322 (with a micro-PCRF/micro-PCEF component 323 installed thereon), MME component 324 (with a PCRF/PCEF component 325 installed thereon), an SGW component 326, a PGW component 328 (with a PCRF/PCEF component 327 installed thereon), and an Internet component 330.

Accordingly, as illustrated in the example embodiment depicted in FIG. 3, at least one embodiment of the invention includes implementing virtualized PCRF and PCEF components in base-stations and/or eNodeB components. Billing occurs locally in the PCRF and PCEF components, which communicate via a REST interface to a main PCEF to reconcile information. One or more embodiments of the invention includes implementing virtualized PCRF and PCEF components in every eNodeB such that paths can be optimized. On top of these virtualized PCRF and PCEF components, at least one embodiment of the invention can include adding MME functionalities to optimize routes between users based on an evaluation of link to conditions. The availability of MME functionalities can utilize the best eNodeBs to serve the UEs based on the dynamic link conditions associated with the UEs, and to directly establish paths between eNodeBs based on information available with the MME functionality regarding the current eNodeBs serving users.

One or more embodiments of the invention can further include using the implemented virtualized PCRF and PCEF components to dynamically adjust data paths/routes based on variables such as caller and/or callee localities, and type(s) of application. Such an embodiment can additionally admit flows with different characteristics to promote lower latencies and/or lower congestion. Further, such an embodiment can include tuning and/or modifying routes based on parameters such as the time of the day or the amount of load.

Additionally, at least one embodiment of the invention includes implementing an API-based framework, which can include a read API to transmit policies from a central PCRF to a micro-PCRF, as well as a write API to transfer charging from a micro-PCEF to a central PCEF. Accordingly, FIG. 4 is a diagram illustrating APIs for a micro-PCRF and a micro-PCEF, according to an example embodiment of the invention.

Figure 4:
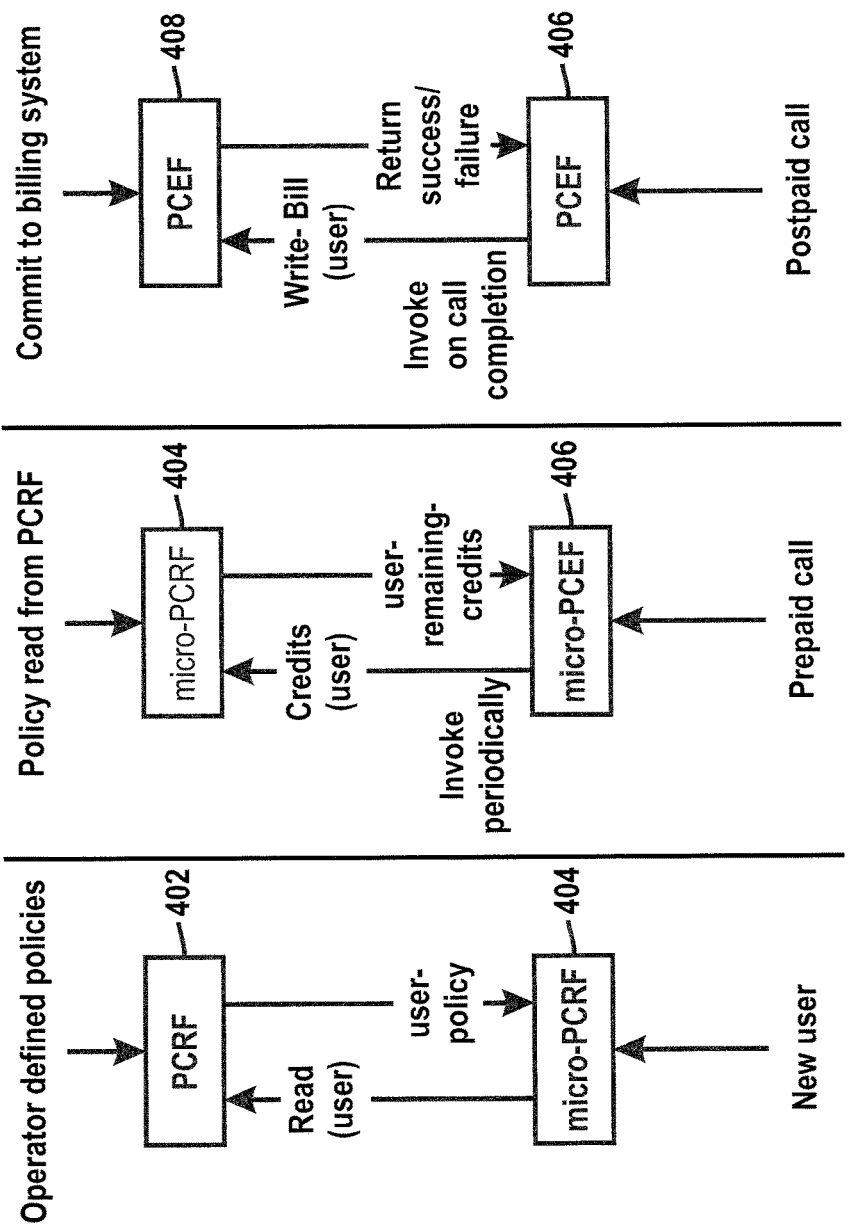
FIG. 4 is a diagram illustrating application programming interfaces (APIs) for a micro-policy and charging rules function (PCRF) and a micro-PCEF, according to an example embodiment of the invention.

By way of illustration, FIG. 4 depicts PCRF 402, which receives operator-defined policies, and micro-PCRF 404, which receives input from a new user. Micro-PCRF 404 reads via PCRF 402, and PCRF 402 provides user-policy to micro-PCRF 404. FIG. 4 also depicts micro-PCRF 404, subsequent to the policy read from PCRF 402, interacting with micro-PCEF 406, which receives input associated with a pre-paid call. Micro-PCEF 406 can (periodically) provide (user) credits to micro-PCRF 404, which can provide micro-PCEF 406 with a notification of remaining user credits (wherein the user credits can be based on a pre-paid balance associated with the user).

Further, FIG. 4 depicts micro-PCEF 406, which receives input associated with a post-paid call, interacting with PCEF 408 upon completion of a call. Micro-PCEF 406 writes a bill to PCEF 408, and PCEF 408 returns a success or failure notification to micro-PCEF 406 and also provides a commit to the billing system. Here, a commit to the billing system refers to ensuring that information gathered at micro-PCEF/micro-PCRF nodes are communicated back to the remote PCEF/PCRF nodes without loss of information at the micro-PCEF/micro-PCRF nodes until a confirmation is received from the remote PCEF/PCRF nodes regarding the reception of information at the remote PCEF/PCRF nodes. This ensures that the billing information is eventually consistent and delivered to the remote PCEF/PCRF nodes as required in the system, despite the split of the billing functionality between micro-PCEF/PCRF nodes and remote PCEF/PCRF nodes.

Figure 5:
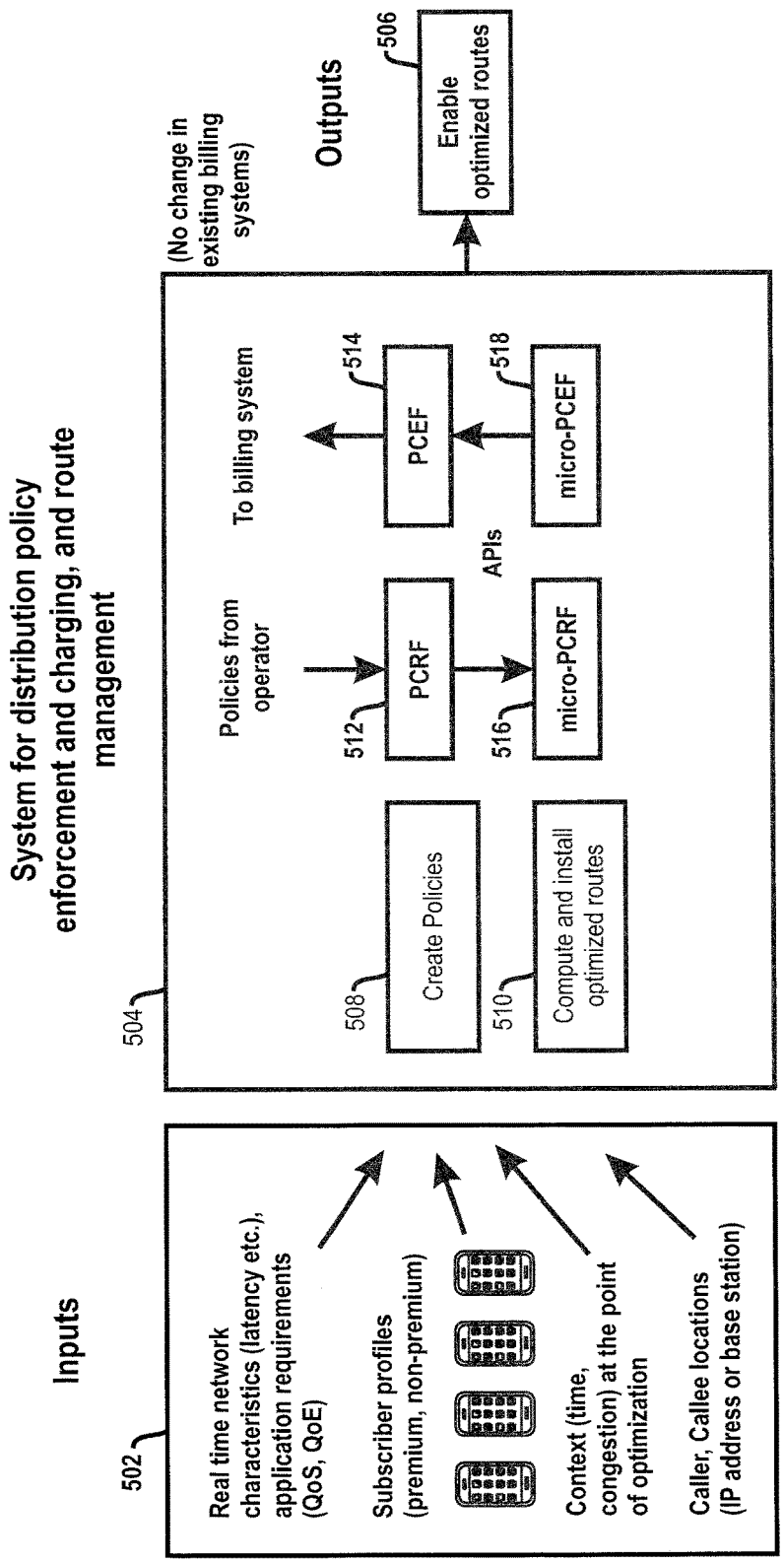
FIG. 5 is a diagram illustrating system architecture, according to an example embodiment of the invention.

FIG. 5 is a diagram illustrating system architecture, according to an example embodiment of the invention. By way of illustration, FIG. 5 depicts inputs 502, a system 504 for distributed policy enforcement and charging and route management, and outputs 506. Inputs 502 can include, for example, real-time network characteristics (such as latency, etc.) and application requirements (such as quality of service (QoS), QoE, etc.). Inputs 502 can also include, for example, subscriber profiles (indicating premium versus non-premium subscriptions, for instance), context information (such as time, congestion) at the point of optimization, and caller and/or callee location information (IP address, base station, etc.).

System 504 includes a policy creation component 508, an optimized route computation and installation component 510, and APIs including a PCRF API 512 (which receives policies from an operator/user), a micro-PCRF API 516, a micro-PCEF API 518, and a PCEF API 514 (which provides data to the billing system). As also noted in FIG. 5, outputs 506 include optimized routes.

As detailed herein, at least one embodiment of the invention (such as the example embodiment depicted in FIG. 5) includes maintaining data consistency in distributed billing by requiring no change to the existing back-end billing system. The central PCRF and PCEF interact with the back-end billing system using existing protocols, and at least one embodiment of the invention includes defining READ and WRITE APIs for micro-PCEF and micro-PCRF to interact with the central PCRF and the central PCEF.

Additionally, at least one embodiment of the invention includes implementing rule-sets to satisfy billing properties such as, for example, that the system should bill every byte carried by the network and that the system should not bill any byte more than once. Such rule-sets can include, for example, the following: (i) Charges to the caller user equipment (UE) should be levied at the originating eNodeB's PCEF; (ii) Charges (when applicable) to the receiver UE should be levied at the receiving eNodeB's PCEF; (iii) Upon hand-off of the UE, an old eNodeB will immediately write billing information with the central PCEF, and when the hand-off is complete, billing will be taken-over by the PCEF in the new eNodeB; (iv) For pre-paid numbers, PCRF writes the billing information periodically with the central PCRF during a call (wherein this period can be, for example, at the granularity of one second or multiples of one second); and (v) For post-paid numbers, PCEF writes the billing information with the central PCEF immediately after call completion.

Figure 6:
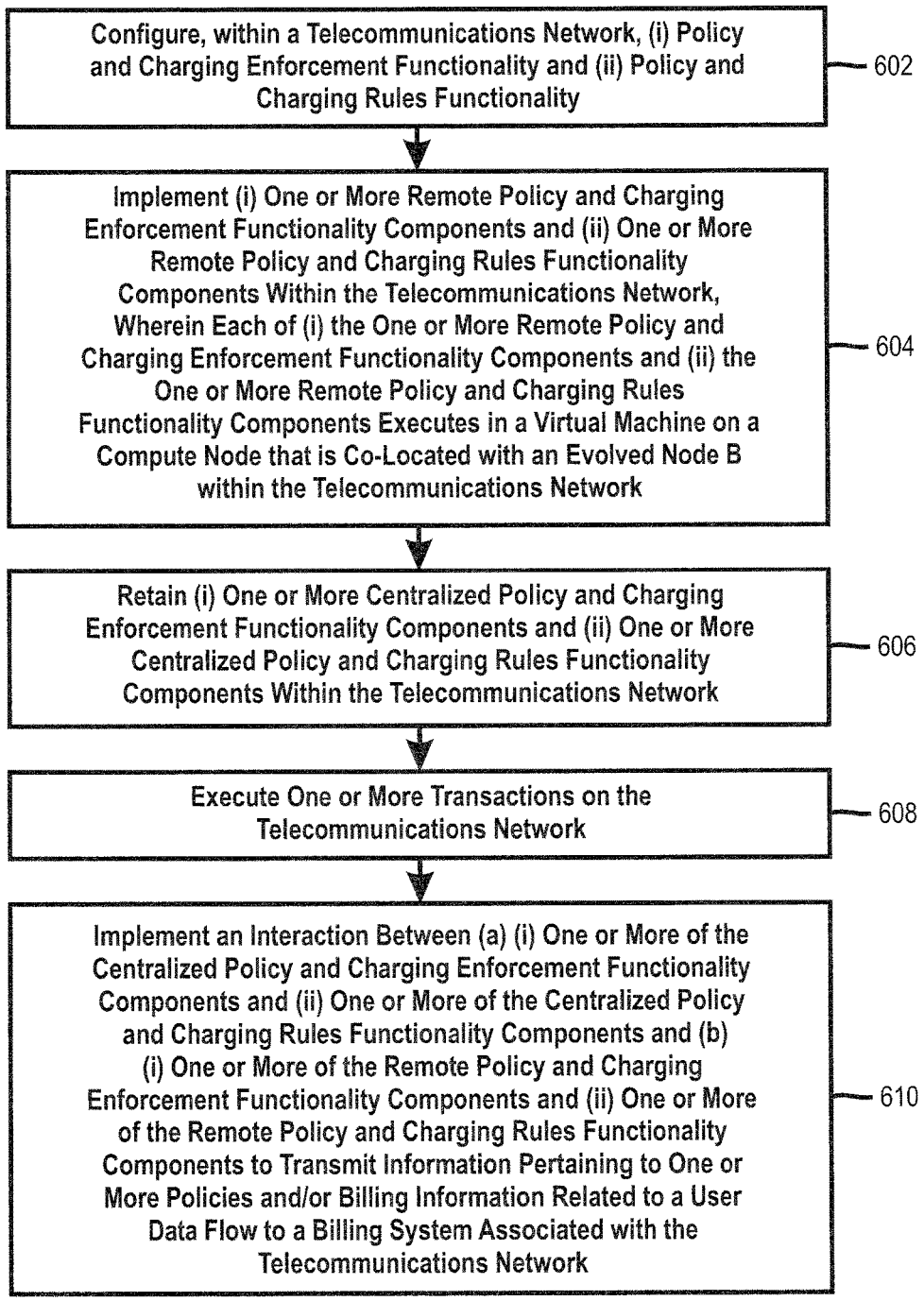
FIG. 6 is a flow diagram illustrating techniques according to an embodiment of the invention.

FIG. 6 is a flow diagram illustrating techniques according to an embodiment of the present invention. Step 602 includes configuring, within a telecommunications network (for example, a cellular network), (i) policy and charging enforcement functionality and (ii) policy and charging rules functionality. Step 602 can further include steps 604 and 606.

Step 604 includes implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a virtual machine on a compute node that is co-located with an evolved node B within the telecommunications network. In one or more embodiments of the invention, each of (i) the one or more remote policy and charging enforcement functionality components and (ii) the one or more remote policy and charging rules functionality components can alternatively execute in a software container on a compute node that is co-located with an evolved node B within the telecommunications network.

Step 606 includes retaining (i) one or more centralized policy and charging enforcement functionality components and (ii) one or more centralized policy and charging rules functionality components within the telecommunications network.

Step 608 includes executing one or more transactions on the telecommunications network. Executing can include routing the user data flow through a path that optimizes one or more metrics. The one or more metrics can include congestion in the telecommunications network, and/or end-to-end delay. Step 608 can further include step 610.

Step 610 includes implementing (a) an interaction between (i) one or more of the centralized policy and charging enforcement functionality components and (ii) one or more of the centralized policy and charging rules functionality components and (b) an interaction between (i) one or more of the remote policy and charging enforcement functionality components and (ii) one or more of the remote policy and charging rules functionality components to transmit information pertaining to one or more policies and/or billing information related to a user data flow to a billing system associated with the telecommunications network. In one or more embodiments of the invention, the user data flow traverses a network path that does not share a network path between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components.

The interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components can include: (c) (i) the one or more of the remote policy and charging enforcement functionality components and (ii) the one or more of the remote policy and charging rules functionality components committing information in a delayed manner to (d) (i) the one or more of the centralized policy and charging enforcement functionality components and (ii) the one or more of the centralized policy and charging rules functionality components.

Additionally, the interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components can include: (c) (i) the one or more of the remote policy and charging enforcement functionality components and (ii) the one or more of the remote policy and charging rules functionality components aggregating information across multiple users before communicating the aggregated information to (d) (i) the one or more of the centralized policy and charging enforcement functionality components and (ii) the one or more of the centralized policy and charging rules functionality components. Aggregating can include combining usage information associated with each of one or more communication sessions into a total usage measure for all of the one or more communication sessions for a given period of time, and converting the total usage measure to an aggregate message that reflects (i) type of usage and (ii) total amount of usage.

Further, as detailed herein, implementing the interaction can include executing a hand-off of the information pertaining to one or more policies and/or the billing information based on said configuring, wherein executing the hand-off comprises executing a hand-off between (a) a first instance of the (i) one or more remote policy and charging enforcement functionality components and the (ii) one or more remote policy and charging rules functionality components within the telecommunications network, and (b) a second instance of the (i) one or more remote policy and charging enforcement functionality components and the (ii) one or more remote policy and charging rules functionality components within the telecommunications network.

As detailed herein, aggregation can include combining all of the individual session usage measurements into an aggregated bulk message that retains the information about the individual session usage measurements, with the entire information communicated in bulk to a centralized policy and charging enforcement entity. This can be a typical method of deployment wherein the operator keeps track of each specific usage to charge a user appropriately.

Figure 7A:
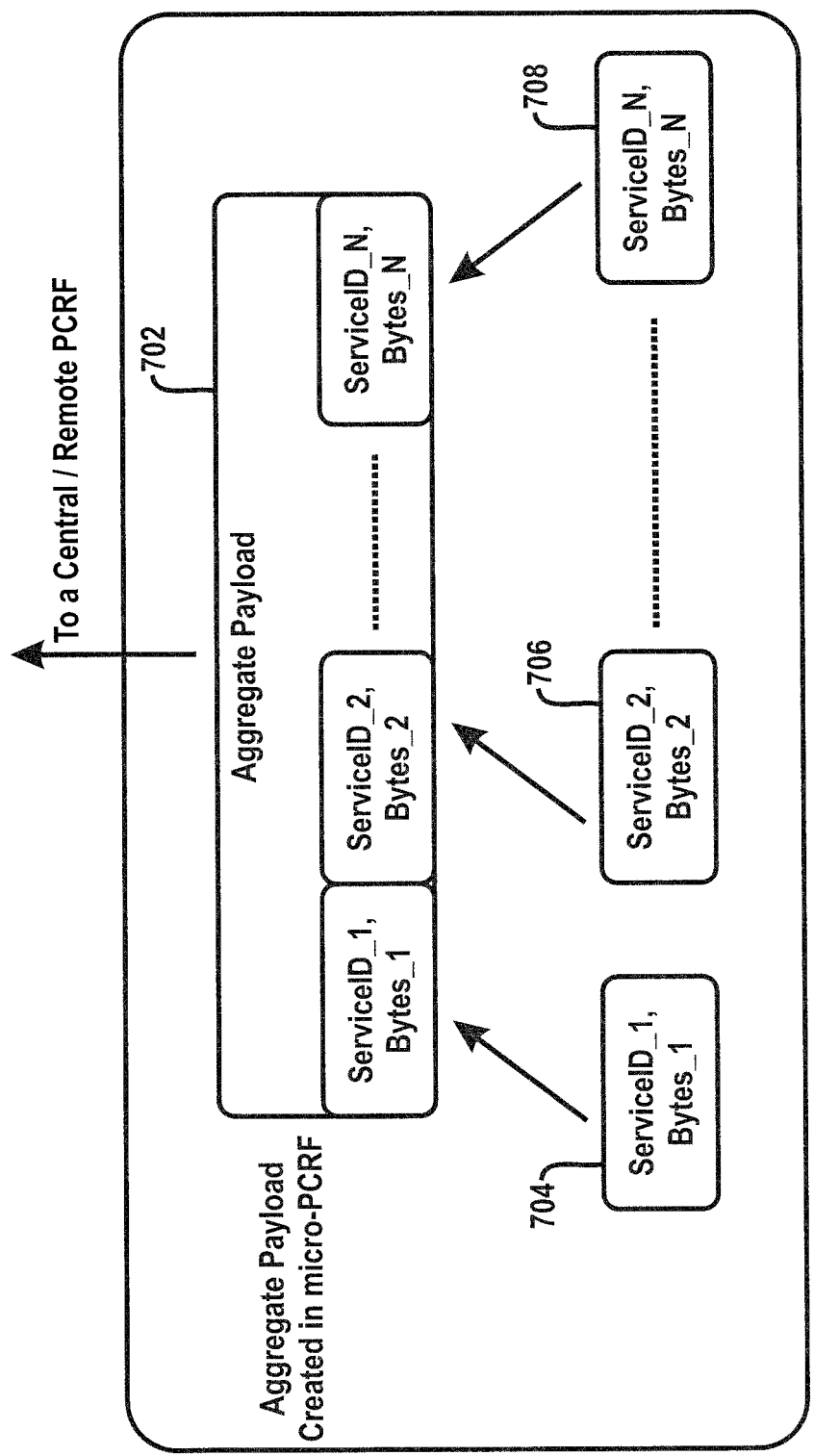
FIG. 7A and FIG. 7B are diagrams illustrating aggregation schemes, according to example embodiments of the invention.
Figure 7B:
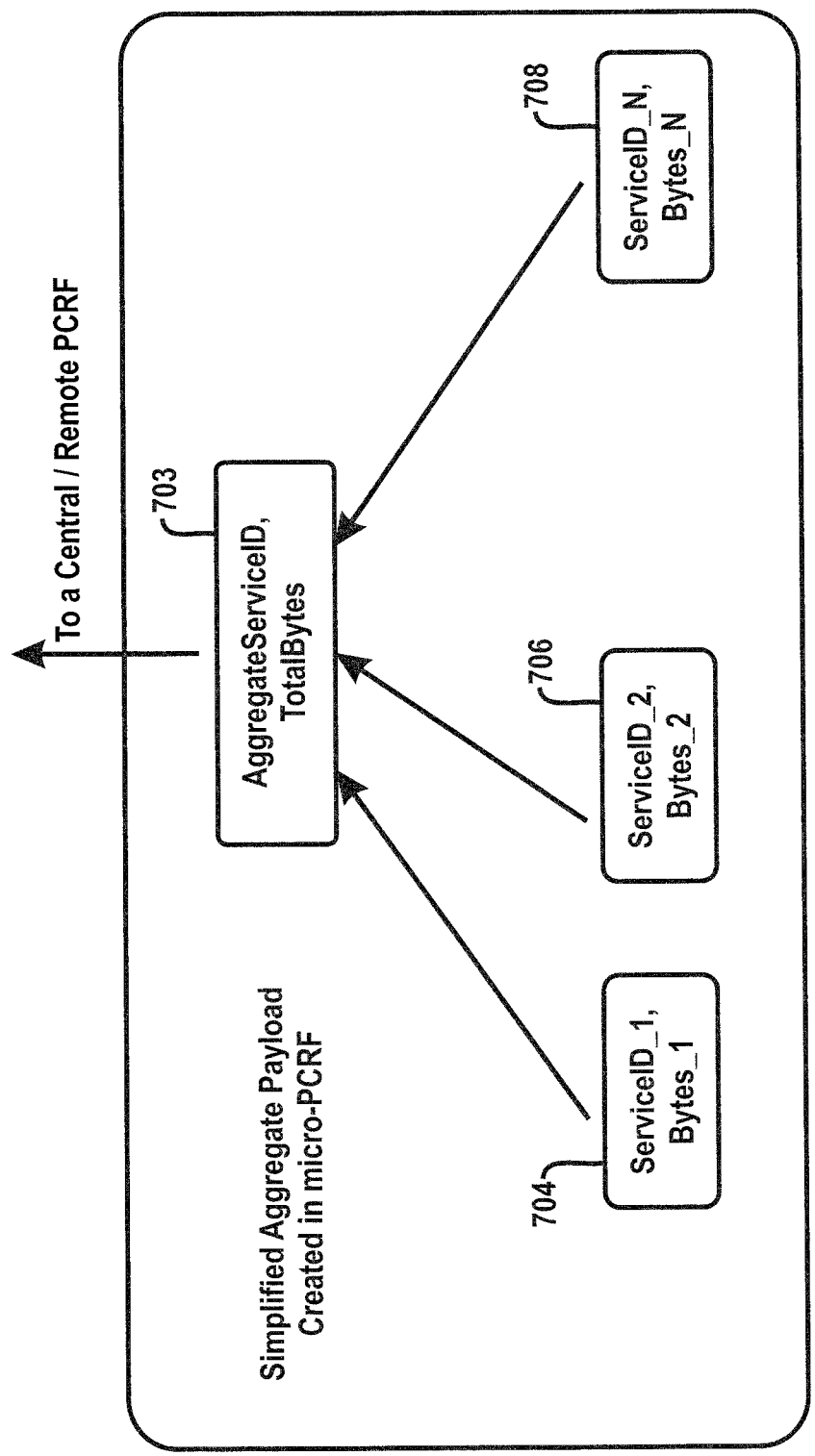

FIG. 7A and FIG. 7B are diagrams illustrating aggregation schemes, according to example embodiments of the invention. In one or more scenarios, a network operator may only be interested in an aggregate billing associated with a certain service. For example, in a use-case of users in a group of villages communicating with each other in a village, wherein the communications between users are established purely with a local geographical region and using only local wireless infrastructure, the operator may only be interested in the shared usage of such spectrum across the users.

An alternate example may include students and teachers within a school exchanging information via the operator's infrastructure in a remote village with optimized local routing. In this alternate case as well, the operator may only be interested in the aggregate usage within the school. In both cases, the operator could offer an optional service of not charging for such services for locally optimized communications, or the operator may choose to charge minimally for such usage, wherein the charge (if any) is paid by a central village community managed at a village hub, or paid by the school authority (respectively). Alternatively, the operator may be interested in an aggregate usage of the spectrum for specific mobile applications for a user or a group of users. In all such cases or similar use-cases, rather than sending information about each specific instance of usage associated with such communications or activity, only the aggregated amount of usage is communicated periodically (or is communicated whenever connectivity is available) to a centralized policy and charging enforcement entity.

In such cases, the bytes usage associated with each communication session are combined into a total usage for all communications sessions during a certain period (such as a day), and then replaced by a single simplified aggregate message that reflects the type of usage (user service, school service, or a user service/application) and the total amount of usage (total bytes and/or total network time spent). Such an aggregate message creation is depicted in FIG. 7A, wherein an aggregate payload 702 includes aggregated elements 704, 706 and 708, and wherein ServiceID_1, ServiceID_2, . . . ServiceID_N can include service information for each of N sessions for users or school students or a user application, and Bytes_1, Bytes_2, . . . Bytes_N can include the specific amount of bytes transferred for each of the sessions.

Also, as depicted in FIG. 7B, a simplified aggregate message can be created at a micro-PCRF node with an aggregated service identifier (AggregatedServiceID) component 703 that reflects the type of aggregation (intended for users in an area, or for a school, or for a user application) along with the sum of the bytes (wherein, for example, total bytes=$\Sigma_{k=1,N}$ Bytes_k). This simplified aggregate message is communicated by the micro-PCRF node to a remote/central PCRF node.

In other variants, the micro-PCRF can store the specific message information for each service identifier locally, and communicate such information if needed or at a later point in time relative to the communication of the AggregateServiceID message. Alternatively, if backhaul communications are limited, the locally stored information can be communicated if needed by alternate means of transport such as transporting the stored information on a universal serial bus (USB) drive without using a telecommunications network (such as using a vehicle), to be received at a remote or central location at a future point in time.

More generally, one or more embodiments of the invention can be used in evolving 4G systems (or future 5G/6G systems) as well included in virtualized infrastructure based on network function virtualization (NFV) or software defined network (SDN) technologies. Accordingly, FIG. 8A through FIG. 8E are diagrams illustration example system architecture configurations, according to one or more example embodiments of the invention.

Figure 8A:
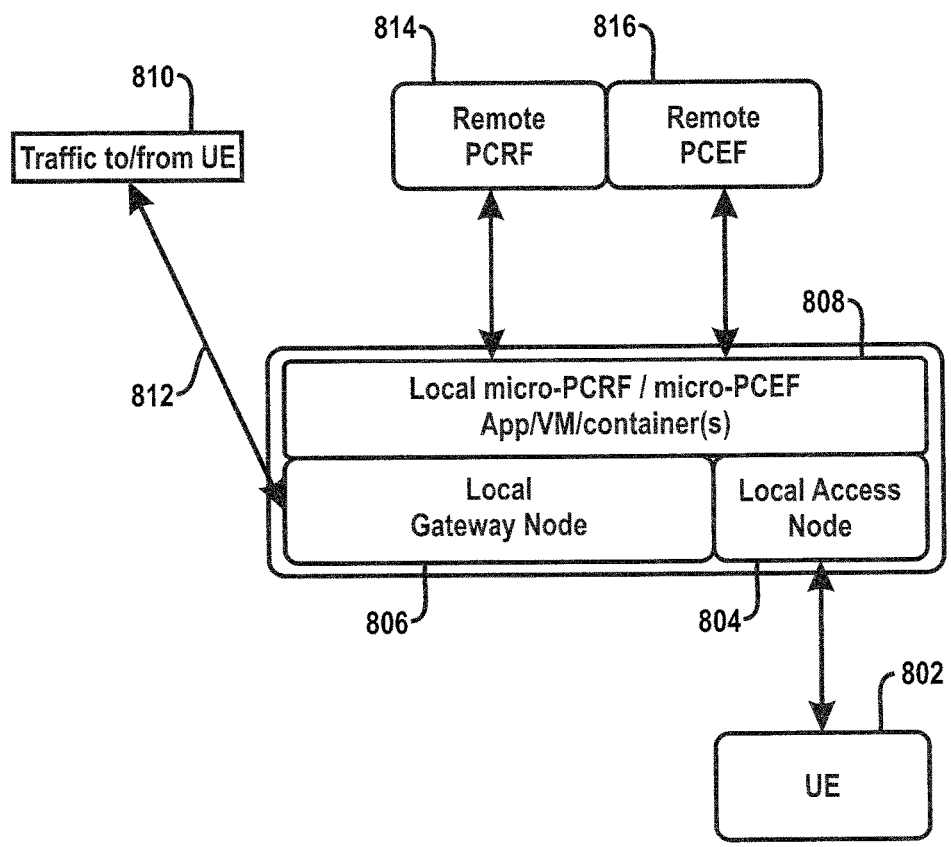
FIG. 8A through FIG. 8E are diagrams illustration example system architecture configurations, according to one or more example embodiments of the invention.

FIG. 8A depicts a user equipment (UE) or device 802 such as a mobile phone, a smartphone, a tablet, or a laptop belonging to a user connecting to an access node 804. The access node 804 is co-located with a gateway path 806 that allows the traffic 810 to and from the UE via a local optimized route 812. Local micro-PCRF/PCEF node(s) 808 can execute locally as an application or execute locally as a virtual network function in a virtual machine or as a containerized application.

As depicted in the example embodiment illustrated in FIG. 8A, these three components (804, 806 and 808) can be co-located. In virtualized infrastructure settings, software associated with the local micro-PCRF/PCEF node 808, with the gateway node 806, and with the network access node 804 can all execute within VMs or containers or merely as applications on a shared computing/networking platform such as a mini-data-center at the edge. The local micro-PCRF/PCEF node(s) 808 will intercept the traffic 810 associated with the UE 802 and communicate billing information with remote PCRF node(s) 814 and remote PCEF node(s) 816, and can also obtain billing plans associated with the UE 802 to help serve the UE locally. Additionally, the local micro-PCRF/PCEF node(s) 808 can provide support for features such as aggregate messaging and/or hand-offs, as described herein.

Figure 8B:
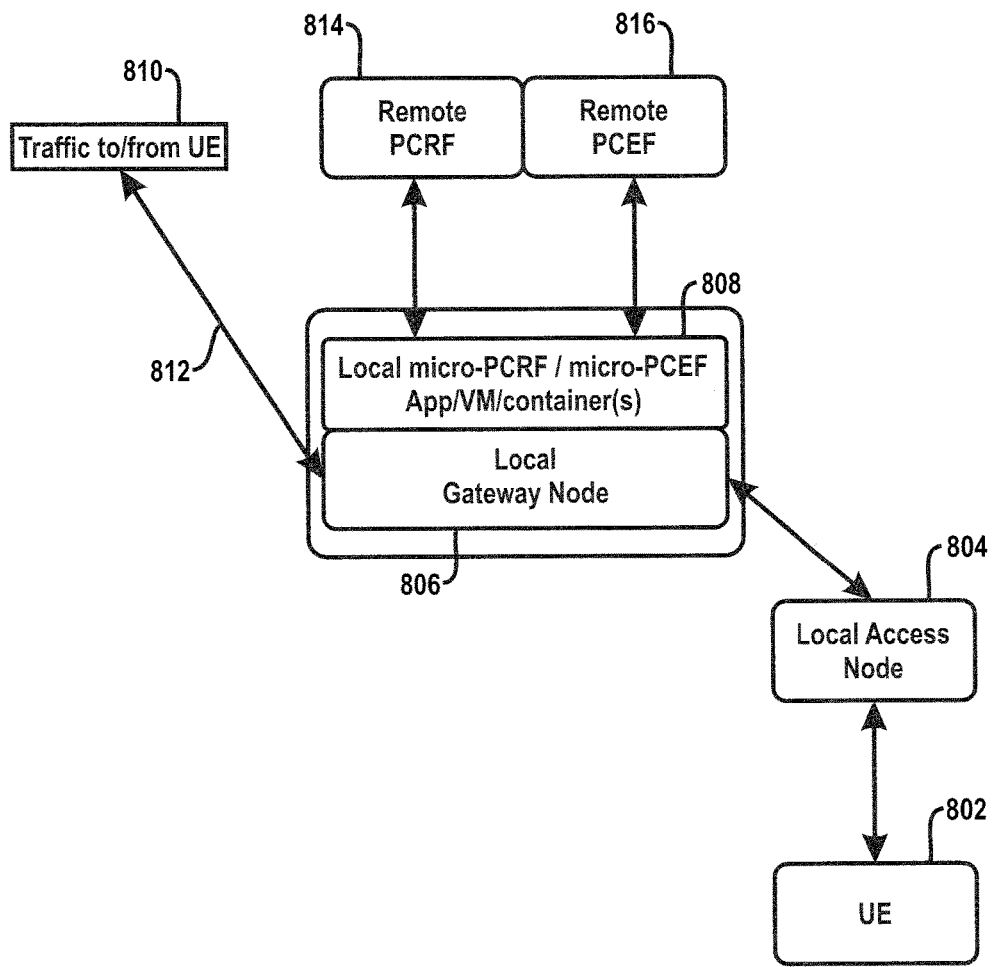
Figure 8C:
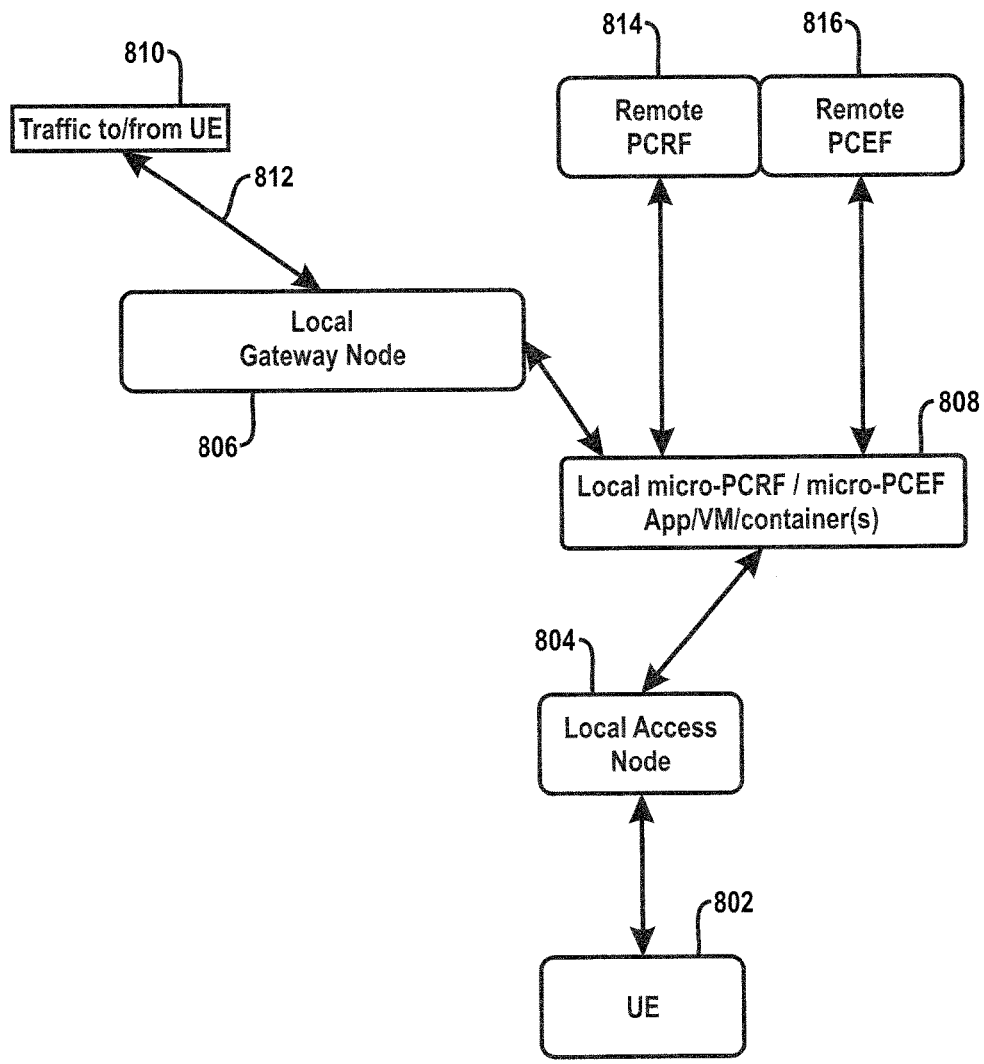

In one or more deployments, the access node 804 may be physically separated from the gateway node 806 and local micro-PCRF/PCEF node(s) 808 as shown in FIG. 8B. More generally, the local micro-PCRF/PCEF node(s) 808 may be placed anywhere in the route path between the access node 804 and the gateway node 806, as shown in the example embodiment depicted in FIG. 8C, and further including the possibility of the local micro-PCRF/PCEF node(s) 808 being co-located with the access node 804 or the gateway node 806, or co-located with both the access node 804 and the gateway node 806. Gateway nodes (such as 806) typically provide access to a packet network that can carry traffic (such as 810) to/from the UE (such as 802), wherein the backhaul connectivity can be wired (digital subscriber line (DSL), optical, Ethernet, etc.) or wireless (cellular, Wi-Fi or satellite backhaul, for example). An access node (such as 804) can generally include be any node that provides network access over a wired or wireless infrastructure, 2G, 2.5G, 3G cellular base-stations, 4G LTE ENodeBs, 5G/6G base-stations, small cells, Wi-Fi hotspots, femtocells, picocells, home or enterprise Wi-Fi access nodes, or a wired/wireless local area network (LAN) switch/router, hybrid Wi-Fi and LTE access points, etc. Access nodes (such as 804) can provide service over wired connections or over licensed, unlicensed and/or whitespace spectra.

Figure 8D:
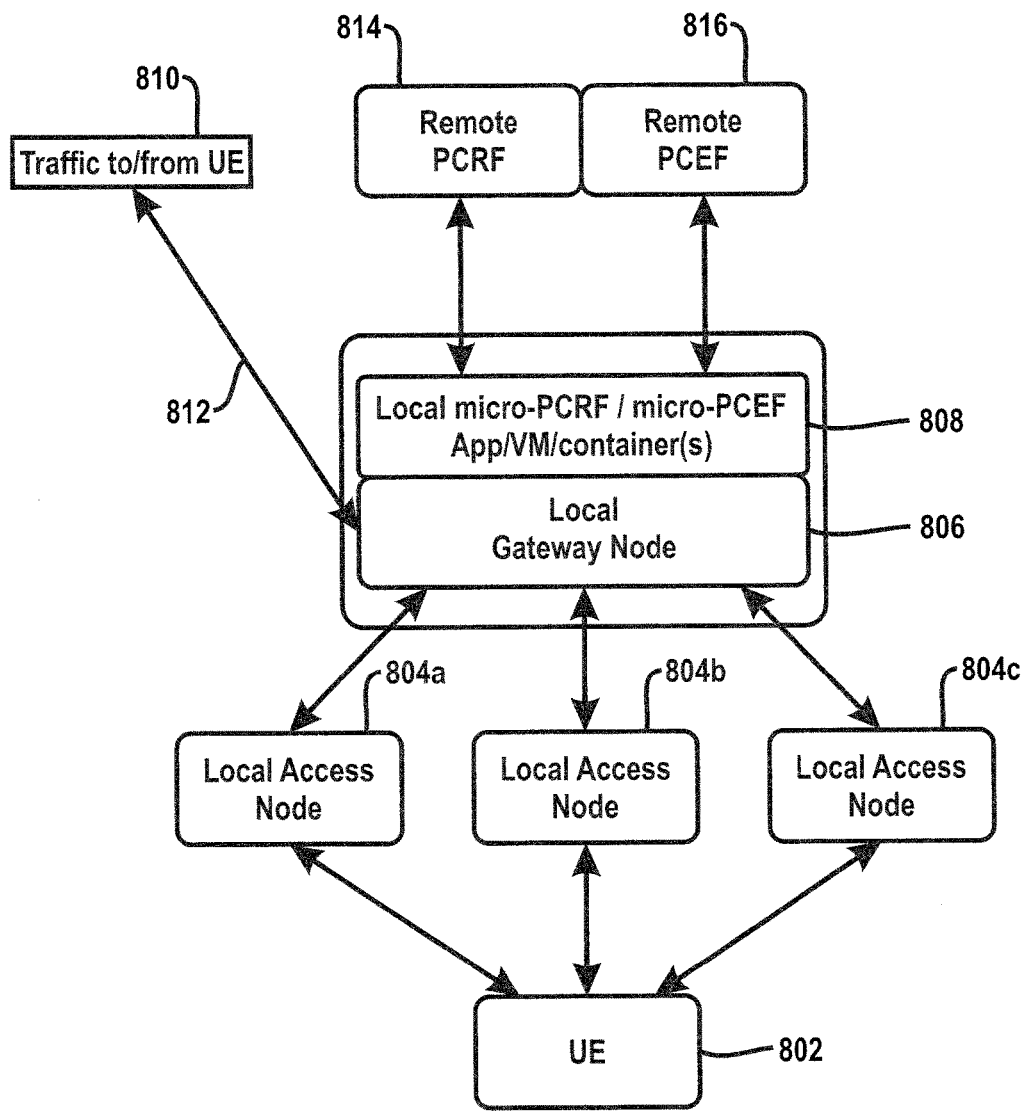

FIG. 8D depicts multiple access nodes (804a, 804b, and 804c) connected to the local gateway node 806, wherein the local micro-PCRF/PCEF node(s) 808 is/are co-located with the gateway node 806. In such an embodiment, as the UE 802 moves, different access nodes (from among 804a, 804b, and 804c) may serve the UE 802, utilizing a common gateway node 806. Thus, mobile users can be better served by gateway nodes and local micro-PCRF/PCEF nodes, wherein such nodes can be shared across multiple access nodes. Such an embodiment includes retaining the use of the same local micro-PCRF/PCEF node(s) across multiple access nodes. Consequently, highly mobile users (whose velocity exceeds a certain threshold value, for example) may be served by local micro-PCRF/PCEF nodes that share multiple access nodes. However, users that are static or pseudo-static (less mobile users whose velocity falls below or equal to a certain threshold value, for example) may be served by a local micro-PCRF/PCEF node that is closer to access node serving those users. By way merely of illustration, an example threshold value for such a velocity can be a walking speed threshold of 5 kilometers per hour (km/hour).

Correspondingly, the gateway node function supporting highly mobile users can be placed such that the gateway node is shared by multiple access nodes. However, a gateway node that supports static or pseudo-static users may be placed closer to the access node supporting those users. Alternatively, to support all users, whether they are highly mobile, static, or pseudo-static, the gateway node function and the local PCRF/PCEF node function can be placed such that multiple access nodes can share the functions associated with these nodes.

Figure 8E:
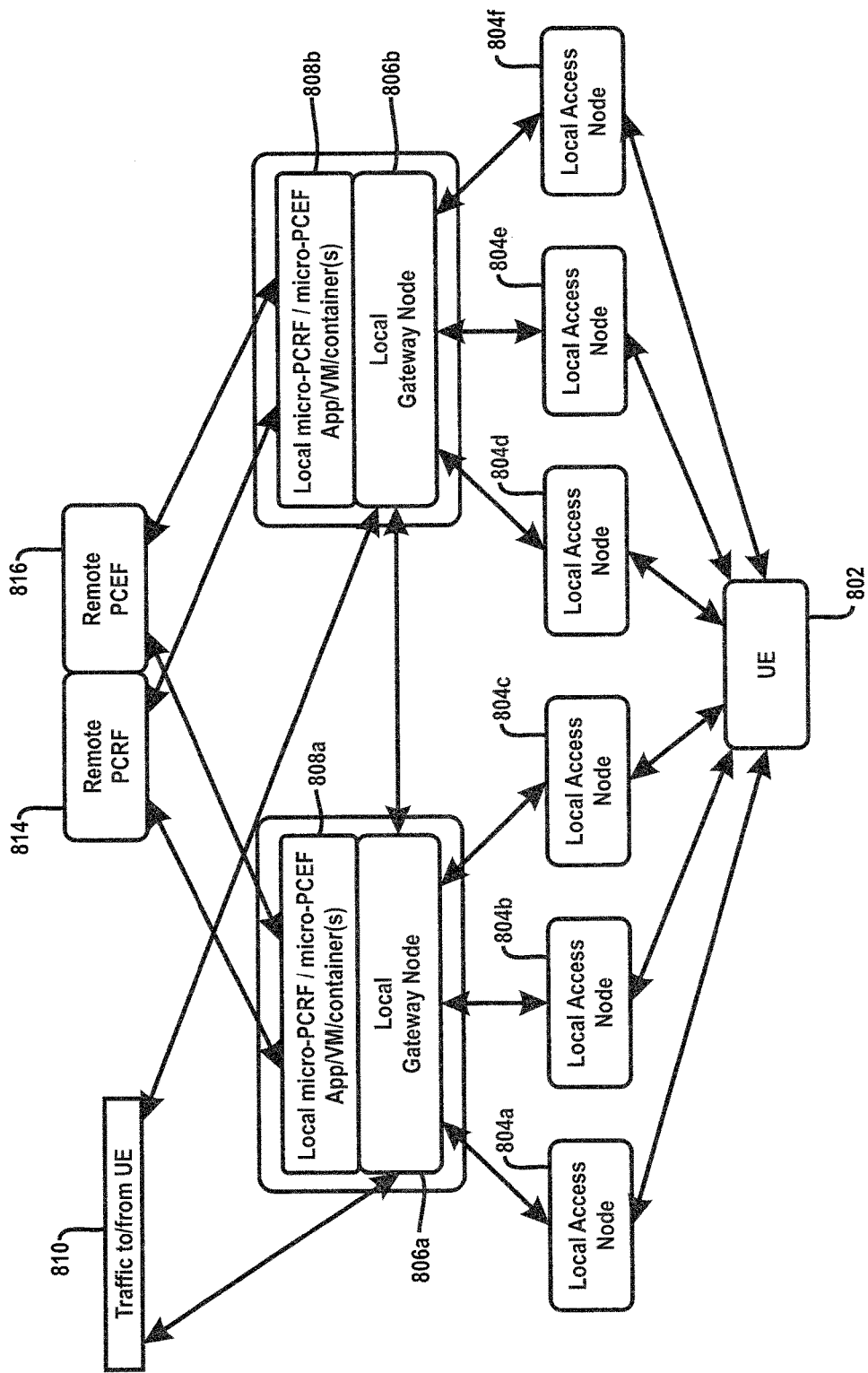

By way of illustration, and as illustrated in FIG. 8E, when a UE 802 moves out of a geographical region served by a particular gateway node (806a) along with its associated local micro PCRF/PCEF node(s) (808a) and its associated access points (804a, 804b, and 804c), the UE 802 may be served by a different gateway node (806b) along with its associated local micro PCRF/PCEF node(s) (808b) and its associated access points (804d, 804e, and 804f). Such an example embodiment of the invention is depicted in FIG. 8E. In such instances, billing information (such as charging plan information and/or the number of bytes currently served to the UE) can, for example, be exchanged between the local micro-PCRF/PCRF nodes (808a and 808b). A local micro-PCEF/PCRF node (808a or 808b) can consolidate its billing information for the UE directly to a remote PCRF/PCEF node (814 or 816). Alternatively, a local micro-PCEF/

PCRF node (808*a* or 808*b*) can consolidate such information to the next serving local micro-PCEF/PCRF node for the UE.

Referring again to FIG. 6, and as detailed herein, the steps depicted in FIG. 6 can be carried out by at least one computing device in communication with the telecommunications network. Also, in at least one embodiment of the invention, (i) the one or more of the remote policy and charging enforcement functionality components interact with (ii) the one or more of the remote policy and charging rules functionality components to determine one or more policy rules on the user data flow. Additionally, in one or more embodiments of the invention, (i) the one or more of the remote policy and charging enforcement functionality components interact with (ii) the one or more of the remote policy and charging rules functionality components to enforce one or more policy rules on the user data flow.

Additionally, the techniques depicted in FIG. 6 can also include providing (i) the one or more of the remote policy and charging enforcement functionality components and (ii) the one or more of the remote policy and charging rules functionality components with one or more rules associated with one or more users served by (a) the one or more of the centralized policy and charging enforcement functionality components and (b) the one or more of the centralized policy and charging rules functionality components.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
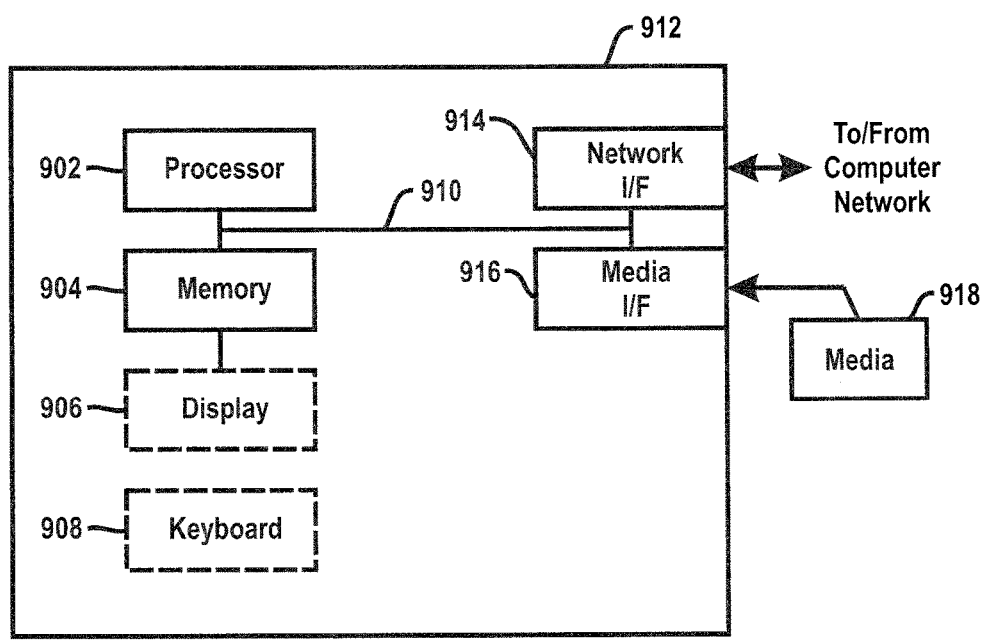
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, splitting the PCEF/PCRF functionality into a local micro-PCEF/PCRF entity while retaining the functionalities at a central level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   configuring, within a telecommunications network, (i) policy and charging enforcement functionality and (ii) policy and charging rules functionality by:
      implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a virtual machine on a compute node that is co-located with an evolved node B within the telecommunications network; and
      retaining (i) one or more centralized policy and charging enforcement functionality components and (ii) one or more centralized policy and charging rules functionality components within the telecommunications network; and
   executing one or more transactions on the telecommunications network via:
      implementing (a) an interaction between (i) one or more of the centralized policy and charging enforcement functionality components and (ii) one or more of the centralized policy and charging rules functionality components and (b) an interaction between (i) one or more of the remote policy and charging enforcement functionality components and (ii) one or more of the remote policy and charging rules functionality components to transmit information pertaining to one or more policies and billing information related to a user data flow to a billing system associated with the telecommunications network; and
   wherein said executing comprises routing the user data flow through a path that optimizes multiple metrics, wherein the metrics comprise (i) congestion in the telecommunications network and (ii) end-to-end delay, and wherein said routing comprises implementing, to ensure billing consistency during one or more hand-offs across (a) at least one of the (i) one or more remote policy and charging enforcement functionality components and (ii) one or more remote policy and charging rules functionality components and (b) at least one of the (i) one or more centralized policy and charging enforcement functionality components and (ii) one or more centralized policy and charging rules functionality components, one or more synchronization protocols for pre-paid calls within the telecommunications network and one or more synchronization protocols for post-paid calls within the telecommunications network;
   wherein said configuring and said executing are carried out by at least one computing device in communication with the telecommunications network.

2. The method of claim 1, wherein said telecommunications network comprises a cellular network.

3. The method of claim 1, wherein the path does not share a network path between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components.

4. The method of claim 1, wherein the interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components comprises:
   (c) (i) the one or more of the remote policy and charging enforcement functionality components and (ii) the one or more of the remote policy and charging rules functionality components committing information in a delayed manner to (d) (i) the one or more of the centralized policy and charging enforcement functionality components and (ii) the one or more of the centralized policy and charging rules functionality components.

5. The method of claim 1, wherein the interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components comprises:
   (c) (i) the one or more of the remote policy and charging enforcement functionality components and (ii) the one or more of the remote policy and charging rules functionality components aggregating information across multiple users before communicating the aggregated information to (d) (i) the one or more of the centralized policy and charging enforcement functionality components and (ii) the one or more of the centralized policy and charging rules functionality components.

6. The method of claim 5, wherein said aggregating comprises:
   combining usage information associated with each of one or more communication sessions into a total usage measure for all of the one or more communication sessions for a given period of time; and
   converting the total usage measure to an aggregate message that reflects (i) type of usage and (ii) total amount of usage.

7. The method of claim 1, further comprising:
   providing (i) the one or more of the remote policy and charging enforcement functionality components and (ii) the one or more of the remote policy and charging rules functionality components with one or more rules associated with one or more users served by (a) the one or more of the centralized policy and charging enforcement functionality components and (b) the one or more of the centralized policy and charging rules functionality components.

8. The method of claim 1, wherein (i) the one or more of the remote policy and charging enforcement functionality components interact with (ii) the one or more of the remote policy and charging rules functionality components to determine one or more policy rules on the user data flow.

9. The method of claim 1, wherein (i) the one or more of the remote policy and charging enforcement functionality components interact with (ii) the one or more of the remote policy and charging rules functionality components to enforce one or more policy rules on the user data flow.

10. The method of claim 1, wherein said implementing the interaction comprises executing a hand-off of the information pertaining to one or more policies and/or the billing information based on said configuring, wherein said executing a hand-off comprises executing a hand-off between (a) a first instance of the (i) one or more remote policy and charging enforcement functionality components and the (ii) one or more remote policy and charging rules functionality components within the telecommunications network, and (b) a second instance of the (i) one or more remote policy and charging enforcement functionality components and the (ii) one or more remote policy and charging rules functionality components within the telecommunications network.

11. A computer program product, the computer program product comprising a computer readable storage medium having program instructions embodied therewith, the program instructions executable by a device to cause the device to:
   configure, within a telecommunications network, (i) policy and charging enforcement functionality and (ii) policy and charging rules functionality by:
      implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a virtual machine on a compute node that is co-located with an evolved node B within the telecommunications network; and
      retaining (i) one or more centralized policy and charging enforcement functionality components and (ii) one or more centralized policy and charging rules functionality components within the telecommunications network; and
   execute one or more transactions on the telecommunications network via:
      implementing (a) an interaction between (i) one or more of the centralized policy and charging enforcement functionality components and (ii) one or more of the centralized policy and charging rules functionality components and (b) an interaction between (i) one or more of the remote policy and charging enforcement functionality components and (ii) one or more of the remote policy and charging rules functionality components to transmit information pertaining to one or more policies and billing information related to a user data flow to a billing system associated with the telecommunications network; and
   wherein said executing comprises routing the user data flow through a path that optimizes multiple metrics, wherein the metrics comprise (i) congestion in the telecommunications network and (ii) end-to-end delay, and wherein said routing comprises implementing, to ensure billing consistency during one or more hand-offs across (a) at least one of the (i) one or more remote policy and charging enforcement functionality components and (ii) one or more remote policy and charging rules functionality components and (b) at least one of the (i) one or more centralized policy and charging enforcement functionality components and (ii) one or more centralized policy and charging rules functionality components, one or more synchronization protocols for pre-paid calls within the telecommunications network and one or more synchronization protocols for post-paid calls within the telecommunications network.

12. A system comprising:
   a memory; and
   at least one processor coupled to the memory and configured for:
      configuring, within a telecommunications network, (i) policy and charging enforcement functionality and (ii) policy and charging rules functionality by:
         implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a virtual machine on a compute node that is co-located with an evolved node B within the telecommunications network; and
         retaining (i) one or more centralized policy and charging enforcement functionality components and (ii) one or more centralized policy and charging rules functionality components within the telecommunications network; and
      executing one or more transactions on the telecommunications network via:
         implementing (a) an interaction between (i) one or more of the centralized policy and charging enforcement functionality components and (ii) one or more of the centralized policy and charging rules functionality components and (b) an interaction between (i) one or more of the remote policy and charging enforcement functionality components and (ii) one or more of the remote policy and charging rules functionality components to transmit information pertaining to one or more policies and billing information related to a user data flow to a billing system associated with the telecommunications network; and wherein said executing comprises routing the user data flow through a path that optimizes multiple metrics, wherein the metrics comprise (i) congestion in the telecommunications network and (ii) end-to-end delay, and wherein said routing comprises implementing, to ensure billing consistency during one or more hand-offs across (a) at least one of the (i) one or more remote policy and charging enforcement functionality components and (ii) one or more remote policy and charging rules functionality components and (b) at least one of the (i) one or more centralized policy and charging enforcement functionality components and (ii) one or more centralized policy and charging rules functionality components, one or more synchronization protocols for pre-paid calls within the telecommunications network and one or more synchronization protocols for post-paid calls within the telecommunications network.

13. A computer-implemented method, comprising:
configuring, within a telecommunications network, (i) policy and charging enforcement functionality and (ii) policy and charging rules functionality by:
implementing (i) one or more remote policy and charging enforcement functionality components and (ii) one or more remote policy and charging rules functionality components within the telecommunications network, wherein each of (i) the one or more remote policy and charging enforcement functionality components and (ii) the one or more remote policy and charging rules functionality components executes in a software container on a compute node that is co-located with an evolved node B within the telecommunications network; and retaining (i) one or more centralized policy and charging enforcement functionality components and (ii) one or more centralized policy and charging rules functionality components within the telecommunications network; and executing one or more transactions on the telecommunications network via:
implementing (a) an interaction between (i) one or more of the centralized policy and charging enforcement functionality components and (ii) one or more of the centralized policy and charging rules functionality components and (b) an interaction between (i) one or more of the remote policy and charging enforcement functionality components and (ii) one or more of the remote policy and charging rules functionality components to transmit information pertaining to one or more policies and billing information related to a user data flow to a billing system associated with the telecommunications network; and wherein said executing comprises routing the user data flow through a path that optimizes multiple metrics, wherein the metrics comprise (i) congestion in the telecommunications network and (ii) end-to-end delay, and wherein said routing comprises implementing, to ensure billing consistency during one or more hand-offs across (a) at least one of the (i) one or more remote policy and charging enforcement functionality components and (ii) one or more remote policy and charging rules functionality components and (b) at least one of the (i) one or more centralized policy and charging enforcement functionality components and (ii) one or more centralized policy and charging rules functionality components, one or more synchronization protocols for pre-paid calls within the telecommunications network and one or more synchronization protocols for post-paid calls within the telecommunications network;

wherein said configuring and said executing are carried out by at least one computing device in communication with the telecommunications network.

14. The method of claim 13, wherein the path does not share a network path between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components.

15. The method of claim 13, wherein the interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components comprises:

(c) (i) the one or more of the remote policy and charging enforcement functionality components and (ii) the one or more of the remote policy and charging rules functionality components committing information in a delayed manner to (d) (i) the one or more of the centralized policy and charging enforcement functionality components and (ii) the one or more of the centralized policy and charging rules functionality components.

16. The method of claim 13, wherein the interaction between (a) (i) the one or more of the centralized policy and charging enforcement functionality components and (ii) the one or more of the centralized policy and charging rules functionality components and (b) (i) the one or more of the remote policy and charging enforcement functionality components and (ii) the one or more of the remote policy and charging rules functionality components comprises:

(c) (i) the one or more of the remote policy and charging enforcement functionality components and (ii) the one or more of the remote policy and charging rules functionality components aggregating information across multiple users before communicating the aggregated information to (d) (i) the one or more of the centralized policy and charging enforcement functionality components and (ii) the one or more of the centralized policy and charging rules functionality components.

17. The method of claim 13, further comprising:
providing (i) the one or more of the remote policy and charging enforcement functionality components and (ii) the one or more of the remote policy and charging rules functionality components with one or more rules associated with one or more users served by (a) the one or more of the centralized policy and charging enforcement functionality components and (b) the one or more of the centralized policy and charging rules functionality components.

18. The method of claim 13, wherein (i) the one or more of the remote policy and charging enforcement functionality components interact with (ii) the one or more of the remote policy and charging rules functionality components to determine one or more policy rules on the user data flow.

19. The method of claim 13, wherein (i) the one or more of the remote policy and charging enforcement functionality components interact with (ii) the one or more of the remote policy and charging rules functionality components to enforce one or more policy rules on the user data flow.

\* \* \* \* \*